US009909686B2

(12) United States Patent
Feinauer et al.

(10) Patent No.: US 9,909,686 B2
(45) Date of Patent: Mar. 6, 2018

(54) VALVE COMPRISING A TAPPET AND A SENSOR

(71) Applicant: Buerkert Werke GmbH, Ingelfingen (DE)

(72) Inventors: Markus Feinauer, Braunsbach/Steinkirchen (DE); Christof Jacob, Oehringen (DE); Sebastian Kundel, Michelstadt (DE)

(73) Assignee: Buerkert Werke GmbH (DE)

( * ) Notice: Subject to any disclaimer, the term of this patent is extended or adjusted under 35 U.S.C. 154(b) by 0 days.

(21) Appl. No.: 14/750,912

(22) Filed: Jun. 25, 2015

(65) Prior Publication Data

US 2015/0377383 A1     Dec. 31, 2015

(30) Foreign Application Priority Data

Jun. 27, 2014 (DE) .................. 20 2014 102 940 U

(51) Int. Cl.
| F16K 37/00 | (2006.01) |
| F16K 31/122 | (2006.01) |
| F16K 1/10 | (2006.01) |
| F16K 1/36 | (2006.01) |

(52) U.S. Cl.
CPC .......... *F16K 37/0041* (2013.01); *F16K 1/10* (2013.01); *F16K 1/36* (2013.01); *F16K 31/1221* (2013.01)

(58) Field of Classification Search
CPC .......... F16K 37/0041; F16K 31/0679; Y10T 137/8275; Y10T 137/8242; G01F 23/26; G01F 23/60; G01D 5/2258
USPC ............... 137/553, 554; 324/207.15, 207.17; 73/514.31–514.32; 251/129.09, 905
See application file for complete search history.

(56) References Cited

U.S. PATENT DOCUMENTS

| 3,777,255 A * | 12/1973 | Young .................. G01D 5/2033 |
| | | 324/207.17 |
| 4,646,087 A * | 2/1987 | Schumann ........... G01D 5/2073 |
| | | 340/870.31 |
| 4,833,919 A * | 5/1989 | Saito ........................ G01B 7/02 |
| | | 324/207.17 |
| 4,879,511 A * | 11/1989 | Leon ......................... G01B 7/16 |
| | | 137/554 |
| 4,887,465 A * | 12/1989 | Bryne ................... G01D 5/2225 |
| | | 336/136 |
| 5,197,508 A | 3/1993 | Göttling et al. |
| 5,320,123 A | 6/1994 | Corso et al. |
| 5,619,133 A * | 4/1997 | Shank ............... B60G 17/01933 |
| | | 324/207.16 |

(Continued)

FOREIGN PATENT DOCUMENTS

| DE | 4105705 | 9/1992 |
| DE | 4220967 | 1/1994 |

(Continued)

OTHER PUBLICATIONS

German Search Report for German Patent Application No. 20 2014 102 940.0 (dated Feb. 12, 2016).

*Primary Examiner* — Mary McManmon
*Assistant Examiner* — Nicole Gardner
(74) *Attorney, Agent, or Firm* — Klarquist Sparkman, LLP

(57) ABSTRACT

A valve comprises a tappet and a sensor for detecting an adjustment stroke of the tappet, in particular an inductive sensor, wherein the sensor comprises a signal transmitter which comprises a coil, of which the coil axis (S) is substantially in parallel with the axis (A) of the tappet.

20 Claims, 1 Drawing Sheet

(56) References Cited

U.S. PATENT DOCUMENTS

| | | | |
|---|---|---|---|
| 5,706,855 A * | 1/1998 | Heiniger | F16K 37/00 137/554 |
| 6,321,700 B1 | 11/2001 | Hein et al. | |
| 6,474,158 B2 * | 11/2002 | Czarnek | G01D 5/2046 73/305 |
| 7,093,613 B2 * | 8/2006 | Hofling | H01F 7/1607 137/554 |
| 7,322,374 B2 * | 1/2008 | Gebauer | F01L 3/08 123/90.11 |
| 7,605,585 B2 * | 10/2009 | Gualtieri | G01D 5/2073 324/207.15 |
| 8,441,251 B2 * | 5/2013 | Thoss | G01D 5/2073 324/207.15 |
| 8,905,067 B2 | 12/2014 | Maichl et al. | |
| 2004/0129318 A1 * | 7/2004 | Hofling | H01F 7/1607 137/554 |
| 2005/0022876 A1 * | 2/2005 | Gebauer | F01L 3/08 137/554 |
| 2007/0152659 A1 * | 7/2007 | Gurich | F02M 59/44 324/207.24 |
| 2008/0278149 A1 * | 11/2008 | Gualtieri | G01D 5/2073 324/207.17 |
| 2014/0116542 A1 * | 5/2014 | Feinauer | F16K 37/0041 137/554 |
| 2015/0377383 A1 * | 12/2015 | Feinauer | F16K 1/36 137/554 |

FOREIGN PATENT DOCUMENTS

| | | |
|---|---|---|
| DE | 4417464 | 12/1994 |
| DE | 10031237 | 1/2002 |
| DE | 202010003659 | 8/2010 |
| DE | 102011108179 | 1/2013 |
| WO | WO99/13202 | 3/1999 |

* cited by examiner

VALVE COMPRISING A TAPPET AND A SENSOR

CROSS REFERENCE TO RELATED APPLICATION

The present application claims priority from pending German Patent Application No. 20 2014 102 940.0, filed Jun. 27, 2014, which is incorporated herein by reference.

FIELD

The invention relates to a valve comprising a tappet and a sensor for detecting a position of the tappet.

BACKGROUND

From the prior art it is known to detect the position of a valve with the aid of a sensor. In general, there are two types of sensors which are used for detecting the position of the tappet, wherein both types comprise a signal transmitter and a sensor element which cooperates with the signal transmitter. The first type of sensors is defined as passive sensors, of which the signal transmitter is a purely passive element, e.g., a steel part of the tappet. The position of the steel part is detected by the sensor element, making it possible to deduce the position of the tappet.

In the case of the passive sensors, it has proven to be disadvantageous that the signal strength is relatively low by reason of the purely passive signal transmitter. This has a negative influence upon the measuring accuracy. By reason of the low signal strength, the passive sensors have a high level of sensitivity to external perturbations which can falsify the measuring result.

The second type of sensors is also defined as active sensors which have an active signal transmitter which is designed e.g., as an oscillating circuit or a permanent magnet. The signal emanating from the active signal transmitter is detected by the sensor element, whereby the position of the tappet can be determined. The signal strength of the active sensors is considerably higher than that of the passive sensors. However, the assembly outlay is also increased. Typically, the active signal transmitters are a printed circuit board, onto which tracks, which cooperate with the sensor element, are printed. The printed circuit board is mechanically coupled to the tappet and is guided in a laterally spaced-apart manner with respect to the sensor element such that the printed circuit board moves exactly perpendicularly with respect to the sensor element at a predefined spaced interval.

In the case of the active sensors known from the prior art, it has proven to be disadvantageous that the exact arrangement and orientation of the sensor element with respect to the signal transmitter is very complex in order to achieve sufficiently reliable measuring accuracy.

The object of the invention is to provide a valve comprising a sensor which is simple to produce and has a high level of measuring accuracy.

BRIEF DESCRIPTION

In order to achieve this object, the invention provides valve comprising a tappet and a sensor for detecting a position of the tappet, in particular an inductive sensor. The sensor comprises a signal transmitter comprising a coil. The axis of the coil is substantially in parallel with the axis of the tappet. The basic idea of the invention is to link the positive characteristics of a passive sensor with those of an active sensor. This means that a simple structure is provided which still guarantees a high level of measuring accuracy. The structure of the sensor is simplified inter alia by virtue of the fact that no mechanical guidance of the signal transmitter is required. Furthermore, the coil which is part of the signal transmitter ensures that the signal strength is high, whereby the measuring accuracy is also correspondingly high. A range having a deviation of approximately 20° from an exactly parallel orientation is considered to be a substantially parallel arrangement.

In one aspect of the invention, it is provided that the coil of the signal transmitter is a passive resonator coil. Therefore, the sensor comprises a passive signal transmitter which acts as a resonator. This simplifies the structure as no electrical connection of the signal transmitter is required.

In particular, the sensor comprises at least one sensor element which cooperates with the signal transmitter. The sensor element can be designed as a transceiver unit which emits a signal modulated by the signal transmitter. The sensor element then receives the modulates signal. The modulated signal which the sensor element receives can be used to deduce the position of the tappet. Alternatively, the sensor can also comprise more than one sensor element, e.g., a sensor element used as a transmitting unit and a sensor element used as a receiving unit, so that the two functions are separated.

In accordance with a further aspect of the invention, the sensor element radially surrounds the signal transmitter. This arrangement requires an exact arrangement of the signal transmitter and of the sensor element with respect to one another only in the axial direction as a slight deviation does not have a negative influence upon the measuring accuracy. For example, a slight tilting of the signal transmitter relative to the sensor element would produce a smaller distance with respect to a portion of the radially surrounding sensor element and at the same time would produce a larger distance with respect to an opposed portion of the sensor element. These two deviating spaced intervals directly cancel one another out on average, thus making the signal strength constant. Furthermore, the arrangement is not sensitive to a rotation of the signal transmitter relative to the sensor element as the sensor element radially surrounds the signal transmitter. Therefore, simple means are used to create a sensor which has a high level of measuring accuracy and does not have to be oriented in an exact manner for this purpose.

In a further aspect of the invention, it is provided that the sensor element radially surrounds at least a part of the tappet or an extension of the tappet. In the case of this embodiment, the signal transmitter is coupled directly to the tappet, for which reason the sensor element radially surrounds a part of the tappet in order to detect the position of the signal transmitter with sufficient precision also in at least one extreme position.

In particular, the sensor element is a cylindrical air-core coil. A cylindrical air-core coil is an inductive component which does not comprise a soft-magnetic core. Therefore, the sensor element is designed as a coil which comprises a core consisting of air. The magnetic field lines emanating from the sensor element extend substantially in the coil inner space, for which reason the magnetic field generated by the sensor element is not coupled to the outer surrounding area. As a result, external perturbations can be reduced, which in turns increases the measuring accuracy. Alternatively, the coil can also comprise a core consisting of a non-magnetisable material.

In accordance with a further aspect of the invention, the sensor element comprises a longitudinal axis which is substantially in parallel with the axis of the valve spindle and/or with the coil axis, in particular the longitudinal axis of the sensor element coincides with the axis of the valve spindle and/or the coil axis. The coil axis can be the axis of the signal transmitter. This permits a particularly simple structure of the sensor which at the same time has a very high level of measuring accuracy. If the longitudinal axis of the sensor element coincides with the coil axis and the axis of the tappet, a coaxial arrangement of the sensor element in relation to the signal transmitter is formed or a coaxial sensor is formed. This means that the signal transmitter moves in the core of the sensor element, which core is formed by air. This embodiment produces a particularly high level of measuring accuracy and measuring insensitivity with respect to tilting movements, rotations or external perturbations.

In particular, the signal transmitter is coupled to the valve spindle via a coupling element. This produces an easily interchangeable arrangement of the signal transmitter on the valve spindle as the signal transmitter can be detached in a simple manner via the coupling element. Furthermore, a standardised valve can be adjusted by the coupling element such that the signal transmitter always cooperates with the sensor element. For example, a standardised valve can be used in a field of application in which only relatively small lift movements from an extreme position are performed. A larger coupling element then ensures that the signal transmitter does not move continuously at the lower edge or outside the sensor element, but instead moves centrally. The coupling element can represent an extension of the tappet.

In accordance with a further aspect of the invention, the valve comprises a guide, with which the signal transmitter is guided indirectly in the valve. The guide is an indirect guide which cooperates with the tappet or the coupling element, if the latter is provided. The simple mechanical guide which can be designed as a radial stop ensures that the signal transmitter is adjusted substantially in parallel with the longitudinal axis of the sensor element. A tolerable angle range can be adjusted by the guide which means that the guide is used merely for purpose of rough orientation.

BRIEF DESCRIPTION OF THE DRAWINGS

Further advantages and properties of the invention will be apparent from the following description and the drawings to which reference is made. In the drawings.

DETAILED DESCRIPTION

Figures 1, 2:
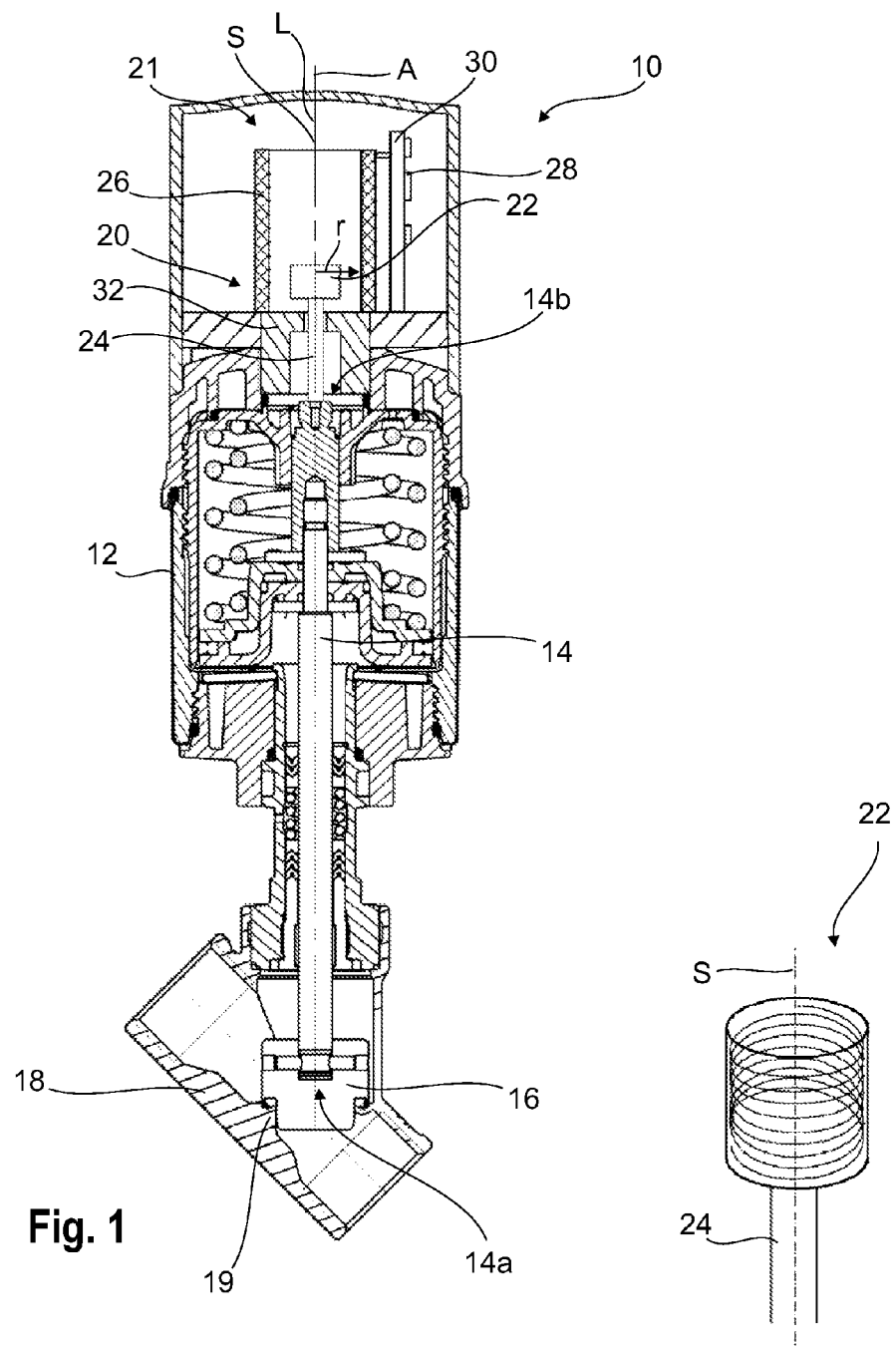
FIG. 1 shows a sectional view of a valve in accordance with the invention.
FIG. 2 shows a perspective view of the signal transmitter of FIG. 1.

FIG. 1 shows a valve 10 which comprises a housing 12. Movably arranged in the housing 12 is a substantially cylindrical tappet 14 which is provided at a first end 14a with a valve element 16 which controls the through-flow amount of a fluid through a pipe 18. For this purpose, the valve element 16 cooperates with a valve seat 19.

The illustrated valve 10 is a pneumatically actuated process valve. Alternatively, valves which can be actuated hydraulically or otherwise can also be provided.

The position of the valve 10, more specifically the tappet 14 and therefore the valve element 16 is established with the aid of a sensor 20. The sensor 20 detects the position of the tappet 14 within the valve 10 indirectly, in order thereby to determine the position of the valve element 16. For this purpose, the sensor 20 is arranged in an upper part of the valve 10, in which a sensor receiving space 21 is formed. As a result, the sensor 20 is protected from the outer surrounding area.

For detecting the position of the tappet 14, the sensor 20 comprises a signal transmitter 22 which is coupled via a coupling element 24 to the tappet 14 at a second end 14b of the tappet 14 which is opposed to the first end 14a.

The signal transmitter 22 is shown in detail in FIG. 2. It is apparent from FIG. 2 that the signal transmitter 22 is a coil having a coil axis S. Alternatively, the signal transmitter 22 can comprise a coil and further components such as a capacitor and/or a resistor. The signal transmitter 22 can thus be designed e.g., as an oscillating circuit.

As is apparent from FIG. 1, the coil axis S of the signal transmitter 22 is substantially in parallel with the axis A of the tappet 14. In the illustrated embodiment, the two axes S, A even coincide.

Furthermore, the sensor 20 comprises a sensor element 26 which radially surrounds the signal transmitter 22. The sensor element 26 is a cylindrical air-core coil which is filled with air instead of a magnetisable core. Furthermore, the sensor element 26 is coupled to a control and evaluation unit 28 which is arranged on a printed circuit board 30 which is oriented in parallel with the sensor element 26.

The control and evaluation unit 28 activates the sensor element 26 such that in the sensor element 26 which is designed as a coil a magnetic field is generated which is modulated by the signal transmitter 22 in dependence upon its position. Therefore, the signal transmitter 22 is electromagnetically excited by the sensor element 26. The modulated magnetic field is detected in turn by the sensor element 26 and is transmitted to the control and evaluation unit 28. The modulation of the magnetic field depends upon the vertical travel the tappet 14 has covered or upon the corresponding position of the signal transmitter 22 which is coupled to the tappet 14 and which reacts resonantly to the generated magnetic field. Therefore, the position of the tappet 14 or of the valve element 16 can be detected by reason of the modulated magnetic field.

Therefore, the signal transmitter 22 is a passive resonator coil which cooperates with the actively activated sensor element 26. This facilitates mounting and assembly of the valve 10, in particular of the sensor 20, as no electrical connection of the signal transmitter 22 is required.

The sensor element 26 radially surrounds the signal transmitter 22, wherein in general the coil axis S of the signal transmitter 22 is formed substantially in parallel with the longitudinal axis L of the sensor element 26. In the illustrated embodiment, all three axes A, L, S coincide, whereby a coaxial arrangement of the sensor 20 is provided as the sensor element 26 radially surrounds the signal transmitter 22 such that the radial spaced interval r between the coil axis S and the sensor element 26 is always the same.

The arrangement of the sensor 20 in accordance with the illustrated embodiment is particularly suitable for achieving a high level of measuring accuracy with low manufacturing outlay as a slight tilting of the signal transmitter 22 relative to the sensor element 26 does not have any negative effects upon the measuring accuracy. A reduced distance from a portion of the sensor element 26, e.g., the left-hand portion in the figure, results in a larger distance from the opposite portion of the sensor element 26, in this case the region on the right. This results in a signal which on average is of equal magnitude so that a rotation or tilting of the signal transmitter 22 relative to the sensor element 26 does not have any effects upon the measuring result. This simplifies the assembly of the sensor 20 as an exact orientation is not required, as is the case with active sensors. However, by reason of the design as a resonator coil a strong measuring signal and thus a high level of measuring accuracy are achieved.

In spite of the insensitivity with respect to a tilting of the signal transmitter 22, a guide 32 can be provided in the valve 10, by means of which the signal transmitter 22 is guided indirectly in the valve 10. In the illustrated embodiment, the coupling element 24 cooperates with the guide 32, wherein the guide 32 forms radial stops for the coupling element 24 which limits a tilting of the signal transmitter 22 so that the signal transmitter is guided substantially in parallel with the axis A of the tappet 14.

Since the sensor 20 is insensitive to a tilting of the signal transmitter 22 in relation to the sensor element 26, it is sufficient if the signal transmitter 22 or the coil axis S is substantially in parallel with the axis of the tappet 14.

In this case, substantially parallel can be considered to mean that the signal transmitter 22 does not come into contact with the sensor element 26, wherein the angle is specified as a function of the dimensions of the sensor element 26 and of the signal transmitter 22. An angular offset of ±20°, in particular ±10°, between the coil axis S and the axis A of the tappet 14 represents a feasible limit.

In an alternative embodiment, it can be provided that the signal transmitter 22 is coupled directly to the tappet 14, wherein the tappet 14 comprises a receiving portion for the signal transmitter 22 which is guided e.g., by the guide 32.

It can also be provided that the sensor 20 comprises two sensor elements 26, wherein a first sensor element 26 is designed to generate the magnetic field and a second sensor element 26 is designed to receive the modulated magnetic field.

The invention claimed is:

1. A valve comprising a tappet and a sensor for detecting an adjustment stroke of said tappet, wherein said sensor comprises a signal transmitter which comprises a single first coil that is a passive resonator coil, said first coil having a coil axis and said tappet having a tappet axis, said coil axis being substantially in parallel with said tappet axis, and wherein said sensor comprises at least one sensor element which comprises a single second coil configured as a transceiver unit that receives and transmits signals from said first coil of said signal transmitter.

2. The valve of claim 1 wherein said sensor element is coupled to a control and evaluation unit, wherein said control and evaluation unit is arranged on a printed circuit board, oriented in parallel with said sensor element, and configured to activate said sensor element.

3. The valve of claim 1 wherein said second coil of said sensor element is configured to emit a signal modulated by said first coil of said signal transmitter and configured to receive said modulated signal, wherein said modulated signal that said second coil receives can be used to deduce a position of said tappet.

4. The valve of claim 1 wherein said sensor element radially surrounds said signal transmitter.

5. The valve of claim 1 wherein said sensor element radially surrounds said tappet at least partially.

6. The valve of claim 1 wherein said tappet has an extension and wherein said sensor element radially surrounds said extension at least partially.

7. The valve of claim 1 wherein said second coil of said sensor element is a cylindrical air-core coil.

8. The valve of claim 1 wherein said sensor element comprises a longitudinal axis which is substantially in parallel with said tappet axis.

9. The valve of claim 1 wherein said sensor element comprises a longitudinal axis which is substantially in parallel with said coil axis.

10. The valve of claim 1 wherein said sensor element comprises a longitudinal axis which coincides with one of said tappet axis and said coil axis.

11. The valve of claim 1 wherein said signal transmitter is coupled to said tappet via a coupling element.

12. The valve of claim 1 wherein said valve comprises a guide, said signal transmitter being guided indirectly in said valve.

13. A valve comprising a tappet and a sensor for detecting an adjustment stroke of said tappet, wherein said sensor comprises a signal transmitter which comprises a single first coil, said first coil having a coil axis and said tappet having a tappet axis, said coil axis being substantially in parallel with said tappet axis, wherein said sensor comprises at least one sensor element which comprises a single second coil configured as a transceiver unit that receives and transmits signals from said first coil of said signal transmitter, wherein said second coil of said sensor element is configured to emit a signal modulated by said first coil of said signal transmitter and configured to receive said modulated signal, wherein said modulated signal that said second coil receives can be used to deduce a position of said tappet, and wherein said second coil of said sensor element is a cylindrical air-core coil.

14. A valve comprising a tappet and a sensor for detecting an adjustment stroke of said tappet, wherein said sensor comprises a signal transmitter coupled to said tappet via a coupling element, wherein said signal transmitter comprises a single first coil, said first coil having a coil axis and said tappet having a tappet axis, said coil axis being substantially in parallel with said tappet axis, and wherein said sensor comprises at least one sensor element which comprises a single second coil configured as a transceiver unit that receives and transmits signals from said first coil of said signal transmitter.

15. The valve of claim 14 wherein said sensor element is coupled to a control and evaluation unit, wherein said control and evaluation unit is arranged on a printed circuit board, oriented in parallel with said sensor element, and configured to activate said sensor element.

16. The valve of claim 14 wherein said sensor element radially surrounds said signal transmitter.

17. The valve of claim 14 wherein said sensor element radially surrounds said tappet at least partially.

18. The valve of claim 14 wherein said tappet has an extension and wherein said sensor element radially surrounds said extension at least partially.

19. The valve of claim 14 wherein said second coil of said sensor element is a cylindrical air-core coil.

20. The valve of claim 14 wherein said valve comprises a guide, said signal transmitter being guided indirectly in said valve.

* * * * *